United States Patent
Hanisch et al.

[11] Patent Number: 6,153,030
[45] Date of Patent: Nov. 28, 2000

[54] METHOD FOR THE MANUFACTURE OF HOLLOW SHAFTS

[75] Inventors: Gustav Hanisch, Hochdorf; Volker Keck, Stuttgart, both of Germany

[73] Assignee: DaimlerChrysler AG, Stuttgart, Germany

[21] Appl. No.: 09/362,745

[22] Filed: Jul. 29, 1999

[30] Foreign Application Priority Data

Jul. 29, 1998 [DE] Germany ............... 198 34 133

[51] Int. Cl.⁷ .................. C21D 9/08; C23C 8/20
[52] U.S. Cl. ............ 148/519; 148/226; 148/233
[58] Field of Search .................. 148/226, 233, 148/519

[56] References Cited

U.S. PATENT DOCUMENTS

| | | | |
|---|---|---|---|
| 4,763,880 | 8/1988 | Smith et al. | 266/87 |
| 5,100,483 | 3/1992 | Rhoads | 148/16.5 |
| 5,405,459 | 4/1995 | Miyamoto et al. | 148/509 |
| 5,424,028 | 6/1995 | Moloney et al. | 420/38 |
| 5,676,769 | 10/1997 | Kawamura | 148/206 |
| 5,853,502 | 12/1998 | Aihara et al. | 148/319 |
| 5,868,871 | 2/1999 | Yokose et al. | 148/211 |
| 5,951,794 | 9/1999 | Dickson, Jr. | 148/690 |

FOREIGN PATENT DOCUMENTS

| | | |
|---|---|---|
| D 3621 | 5/1952 | Germany . |
| 57-171159 | 10/1982 | Japan . |
| 60-39732 | 2/1984 | Japan . |
| 3-28322 | 2/1991 | Japan . |
| 6-271941 | 9/1994 | Japan . |

OTHER PUBLICATIONS

Bargel, Schulze et al: "Werkstoffkunde" 1998, VDI–Verlag GMBH, Düsseldorf XP002121638, pp. 179 –181.

I. A. Useinov et al., "Apparatus for heat treating sleeve pipes after thread cutting," *Metal Science & Heat Treatment*, vol. 16, Nos. 7–8, pp. 594–596, Jul.–Aug. 1974 (publ. Jan. 1975).

*Primary Examiner*—Daniel J. Jenkins
*Assistant Examiner*—Nicole Coy
*Attorney, Agent, or Firm*—Evenson, McKeown, Edwards & Lenahan, P.L.L.C.

[57] ABSTRACT

A method for the production of hollow shafts from welded or seamlessly produced steel tubes having a maximum carbon content of 0.35% includes (1) carburizing a tube to a carbon content greater than 0.5%; (2) slowly cooling the carburized steel tube down from the process temperature, so that it undergoes no increase in hardness; (3) machining and/or non-cutting processing the carburized and soft steel tube to produce a workpiece blank; and (4) hardening the workpiece blank by local heating and quenching at desired points.

6 Claims, 1 Drawing Sheet

METHOD FOR THE MANUFACTURE OF HOLLOW SHAFTS

BACKGROUND AND SUMMARY OF THE INVENTION

This application claims the priority of German Patent Application No. 198 34 133.4, filed Jul. 29, 1998, the disclosure of which is expressly incorporated by reference herein.

The present invention relates to a method for the manufacture of hollow shafts.

Steel tubes, primarily precision steel tubes, are used as the starting material for the production of hollow shafts, especially hollow shafts subjected to high static and dynamic stresses. In addition to welded steel tubes, which are particularly suitable, seamlessly produced steel tubes are also used as the starting material for the production of hollow shafts.

In the production of seamless steel tubes, a blank that is approximately shaft-shaped is provided with an inner cavity by machining or non-cutting processing. The thick-walled hollow body is then drawn out or rolled out over a mandrel. The concentric flutings or inaccuracies that frequently arise in the hollowing-out of the shaft-shaped blank cannot be completely eliminated even by this non-cutting subsequent processing.

In the production of welded steel tubes, however, a steel sheet rolled out to the desired thickness and having a very uniform and dense structure, a good surface quality, and a very consistent sheet thickness is bent to form a tube and is welded. After removal of the projecting part of the weld seam, the tube is repeatedly rolled out or drawn out over a mandrel. After subsequent heat treatment a very uniform structure is formed even in the region of the weld seam.

As a result, welded steel tubes have a significantly better surface than seamless steel tubes, possess more favourable mechanical properties, and are far more precise in their geometrical dimensional accuracy. However, for process reasons, welded steel tubes cannot be produced having a carbon content greater than 0.35% (>0.35%). Such a steel cannot be welded, or can be welded only with severe quality losses.

If a hollow shaft is to be subjected to high torques, a heat treatment, especially hardening, of the hollow shaft is necessary. For the hardening of the hollow shaft, a carbon content of at least 0.4% carbon, preferably from 0.5 to 0.8% carbon, is necessary, which for process reasons cannot be exhibited by a welded steel tube.

In order nevertheless to permit the hardening of such steel tubes, the method described below has become generally established in practice.

Steel tubes having a maximum carbon content of 0.35% are used as starting material. They are processed to form workpiece blanks by machining and/or non-cutting shaping. Subsequently, these workpiece blanks are taken to a hardening shop, where they are carburized at high temperature in a carbon-containing atmosphere to a carbon content of at least 0.5%.

Carburization means that the workpiece blanks remain for a certain residence time at elevated process temperature in a carbon-containing atmosphere so that the carbon can penetrate at least into the surface of the steel tube. The steel thus treated, or at least the surface thereof, can now be hardened and, for that purpose, is quenched directly from the process temperature.

This method, generally known as case-hardening, not only allows the hardening of steels having a carbon content less than 0.4% (<0.4%), but also has other known advantages as a result of the exclusive hardening of the surface layer.

For final processing, the workpiece blanks have to be transported back to the production line where they can be further processed. Production methods such as grinding or lapping are conceivable forms of processing of the hardened blanks. After this production processing step, the desired ready-to-fit workpieces are obtained.

This method causes a high logistical effort, since the carburization and hardening of the workpiece blanks must, for process reasons, be carried out in a separate hardening shop. The method also has an additional serious disadvantage. As a result of the quenching of the blanks directly from the process temperature, serious distortions on hardening take place since the finished blank is abruptly cooled from the process temperature to a low temperature, for example ambient temperature.

The object of the present invention is therefore to provide a method whereby steel tubes can be processed to produce at least partially hardened hollow shafts with a minimum logistical effort.

In the method according to the present invention, carburization of the starting material, specifically of the steel tubes, takes place immediately subsequent to their production. In a manner which is particularly advantageous logistically, the manufacturer of the steel tube can make use of normalization annealing, which is usually necessary in any case, by slightly modifying treatment parameters and by using a carburizing furnace atmosphere.

The mechanical processing of the carburized, but still soft, starting material by machining or non-cutting shaping to form the workpiece blank of the shaft takes place in a production line. The subsequent hardening of the workpiece blank can, especially if it is inductive hardening, be integrated into this production line. Induction hardening can readily be integrated into a production line for machining or non-cutting processing, depending on the type of machines and the necessary infrastructure.

If the requisite surface quality of the hardened workpiece makes further processing thereof necessary, this can likewise be easily integrated into the production line.

In the case of the particularly advantageous inductive hardening, it is also possible for only local areas of the workpiece to be heated and hardened. As a result, the possibility is achieved of hardening workpieces only locally at the points at which this is really desired, for example, at bearing surfaces, toothed profiles or cam profiles. In addition, as a result of the only partial application of heat, distortions caused by hardening occur to a much lesser extent in comparison with normal hardening. As a result, further processing is generally necessary only if forge scale is to be removed or if high surface qualities or concentricity properties are desired, such as, for example, for sealing surfaces. The further processing of the parts after hardening can also be confined either to one part of the workpieces produced or to local areas of the individual workpieces to be further processed.

The method has advantages not only in the case of welded steel tubes, but also permits the quality of hollow shafts made from seamless steel tubes, for which it is naturally entirely possible to produce with a carbon content of 0.5%, to be improved by case-hardening without major logistical effort. To achieve this, it is merely necessary to produce the seamless tubes with a carbon content less than 0.35% (<0.35%) and to process them by the method according to the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
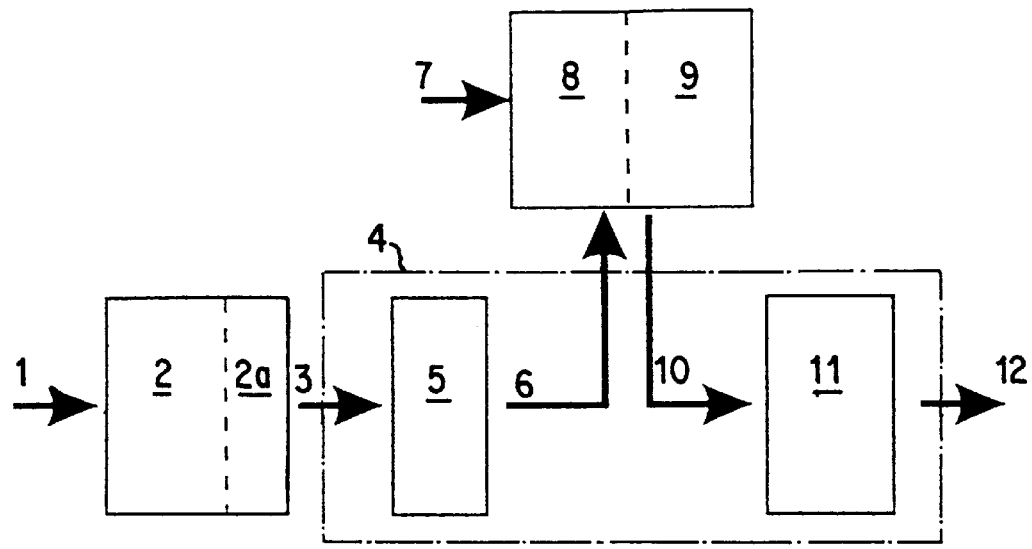
FIG. 1 shows a diagrammatic representation of the production method for hollow shafts according to the prior art.

In the manufacturing method for highly stressed hollow shafts according to the prior art, as shown in FIG. 1, the raw material 1 (steel sheet) is input by the tube manufacturer. The tube is welded and drawn out or rolled out to the desired size. Tube manufacture 2 is generally followed by a heat treatment 2a in the form of normalization annealing. As a result, the drawn or rolled tube again acquires a homogeneous structure. The tube is then transported 3 to the premises of the actual manufacturer of the hollow shafts. There, the tube enters an appropriate production line 4 for the manufacture of hollow shafts.

In a number of production steps 5 the hollow-shaft blanks are manufactured from the steel tubes. In these steps, any known methods of non-cutting forming and/or machining may be used.

The hollow-shaft blanks are then transported 6 to a hardening shop, and for process reasons must leave the actual production line 4. In the hardening shop, the hollow-shaft blanks are brought to an elevated process temperature and the introduction of carbon 7 results in carburization 8 of the hollow-shaft blanks. For the hardening operation 9, the hollow-shaft blanks are then quenched directly from the high process temperature of the carburization step 8. The hollow-shaft blanks are thus hardened over their entire surface and almost always exhibit distortions on hardening, which are caused by the abrupt fall in temperature throughout the hollow-shaft blank. Since the carburization 8 of the hollow-shaft blanks at high process temperature requires a relatively long residence time in a carbon-containing atmosphere, the causes for the occurrence of the distortions due to hardening cannot be avoided in this procedure.

The hollow-shaft blanks then are transported 10 back to the production line 4 for final processing 11 which is necessary in all cases because of the distortions in the hollow-shaft blanks due to hardening. Only then can the ready-to-fit hollow shafts leave 12 the production line 4.

Figure 2:
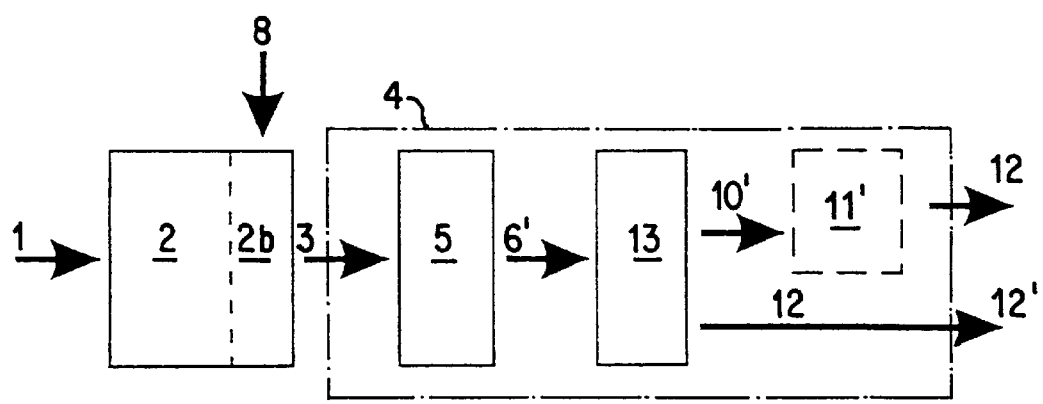
FIG. 2 shows a diagrammatic representation of the production method for hollow shafts according to the invention.

The new method of manufacture for highly stressed hollow shafts according to the present invention, as shown in FIG. 2, differs from the previous method in a number of important aspects.

In this method, raw material 1 (sheet steel) is also input by the tube manufacturer. There, the tube is welded and drawn out or rolled out to the desired size. However, this tube production 2 is now followed by a slightly modified heat treatment 2b. In this step, in addition to the homogenization of the metal structure by normalization annealing, carburization of the tubes is simultaneously achieved by means of the introduction of carbon 8. This requires only a slight modification in the parameters of the heat treatment 2b by comparison with the heat treatment 2a previously customary. A combination of normalization annealing and simultaneous carburizing is in atmosphere containing carbon at a temperature above the temperature used in normalization annealing. This causes only an insignificant additional logistical effort (because of the carbon introduction 8) on the part of the manufacturer of the steel tubes. The heat treatment 2b is concluded by a slow cooling of the tubes, as a result of which the tubes do not increase their hardness, but remain soft.

The carburized but still soft tubes are then transported 3 to the premises of the actual manufacturer of the hollow shafts where the tubes enter an appropriate production line 4. Here, as in the prior art, the hollow-shaft blanks are produced from the tubes in a number of production steps 5.

In the further course of the method, however, the hollow-shaft blanks are transported 6' only within the production line 4 to an inductive hardening step 13. There, the hollow-shaft blanks are hardened in locally limited areas, such as, for example, highly stressed bearing surfaces or cam profiles. This selective local hardening 13 introduces a far lower quantity of heat into the hollow-shaft blanks than is the case in the prior art. As a result, far less pronounced distortions on hardening arise in this method, as a result of which it is possible for at least some of the hollow shafts produced to leave the 12' the production line 4 as ready-to-fit hollow shafts immediately after the inductive hardening 13.

For the remainder of the hollow shafts, for which high surface qualities or very precise tolerances are generally required, final processing is necessary. This takes place in a similar manner to the method described as state of the art, by further transportation 10' of the hollow shafts to the final processing step 11', but this transportation 10' takes place only within the production line 4. After this, these parts also leave the production line 4 in the direction of the arrow 12 as ready-to-fit hollow shafts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the manufacture of hollow shafts, comprising:
    carburizing a welded or seamless steel tube having a maximum carbon content of 0.35% to a carbon content greater than 0.5%;
    cooling the carburized steel tube such that the carburized steel tube undergoes no increase in hardness;
    forming a workpiece blank from the carburized steel tube by at least one of machining or non-cutting shaping; and
    hardening the workpiece blank at one or more points by local heating and quenching.

2. A method according to claim 1, wherein at least local regions of the workpiece blank undergo further processing after said hardening.

3. A method according to claim 1, wherein said hardening of the workpiece blank comprises inductive or conductive hardening.

4. A method according to claim 1, wherein said carburizing takes place during the manufacture of the steel tube together with normalization or recrystallization annealing.

5. A method according to claim 1, wherein said forming and hardening of the workpiece blank takes place in a production line.

6. A method for the manufacture of hollow shafts, consisting essentially of:
carburizing a welded or seamless steel tube having a maximum carbon content of 0.35% to a carbon content greater than 0.5%;
cooling the carburized steel tube such that the carburized steel tube undergoes no increase in hardness;
forming a workpiece blank from the carburized steel tube by at least one of machining or non-cutting; and
hardening the workpiece blank at one or more points by local heating and quenching.

* * * * *